(12) United States Patent
Lummer et al.

(10) Patent No.: US 10,030,518 B2
(45) Date of Patent: Jul. 24, 2018

(54) EXHAUST GAS TURBOCHARGER

(71) Applicant: Bosch Mahle Turbo Systems GmbH & Co. KG, Stuttgart (DE)

(72) Inventors: Dirk Lummer, Ludwigsburg (DE); Martin Kropp, Albershausen (DE)

(73) Assignee: Bosch Mahle Turbo Systems GmbH & CO. KG (DE)

( * ) Notice: Subject to any disclaimer, the term of this patent is extended or adjusted under 35 U.S.C. 154(b) by 93 days.

(21) Appl. No.: 15/157,121

(22) Filed: May 17, 2016

(65) Prior Publication Data

US 2016/0341109 A1 Nov. 24, 2016

(30) Foreign Application Priority Data

May 18, 2015 (DE) .................... 20 2015 104 843 U
Sep. 29, 2015 (DE) ........................ 10 2015 218 696
Mar. 11, 2016 (DE) ........................ 10 2016 204 076

(51) Int. Cl.
*F01D 5/02* (2006.01)
*F02D 23/02* (2006.01)
(Continued)

(52) U.S. Cl.
CPC .............. *F01D 5/021* (2013.01); *F02B 33/40* (2013.01); *F02B 37/025* (2013.01);
(Continued)

(58) Field of Classification Search
CPC ........ F01D 5/021; F02D 23/02; F02B 37/183; F02B 33/40; F02B 37/025; Y02T 10/144; F05D 2260/606
(Continued)

(56) References Cited

U.S. PATENT DOCUMENTS 3,941,035 A * 3/1976 Mueller ................ F02B 37/186
60/602
4,245,953 A * 1/1981 Milton .................. F01D 17/105
415/144
(Continued)

FOREIGN PATENT DOCUMENTS

DE 19853391 A1 5/2000
DE 102013002894 A1 9/2014
(Continued)

OTHER PUBLICATIONS

German Search Report dated Nov. 18, 2016 in relation to corresponding German Application DE 10 2016 204 076.6.
English abstract provided for DE-19853391.

*Primary Examiner* — Hoang Nguyen
(74) *Attorney, Agent, or Firm* — Fishman Stewart PLLC

(57) ABSTRACT

An exhaust gas turbocharger may include a turbine housing and a turbine. The turbine housing may include at least two exhaust gas channels and a partition. A wastegate valve may be arranged such that the at least two exhaust gas channels are connectable to a bypass duct bypassing the turbine. The wastegate valve may include a hollow valve body and a valve seat interacting with the valve body. The wastegate valve may be configured such that at least one of ram supercharging and pulse supercharging is performed. A connecting opening may be arranged between the at least two exhaust-gas channels. The valve body may have a base region configured to facilitate a discharging of an exhaust-gas steam into the bypass duct and/or an overflowing of one exhaust gas channel through the connecting opening into the other exhaust-gas channel.

20 Claims, 4 Drawing Sheets

(51) Int. Cl.
    *F02B 37/02*     (2006.01)
    *F02B 33/40*     (2006.01)
    *F02B 37/18*     (2006.01)

(52) U.S. Cl.
    CPC ............ *F02B 37/183* (2013.01); *F02D 23/02* (2013.01); *F05D 2260/606* (2013.01); *Y02T 10/144* (2013.01)

(58) Field of Classification Search
    USPC .................................... 60/602, 605.1, 605.2
    See application file for complete search history.

(56) References Cited

U.S. PATENT DOCUMENTS

| | | | |
|---|---|---|---|
| 9,708,969 B2* | 7/2017 | McEwan | F02B 37/013 |
| 2005/0086936 A1 | 4/2005 | Bucknell et al. | |
| 2009/0211247 A1* | 8/2009 | McEwan | F01N 11/002 |
| | | | 60/602 |
| 2014/0321986 A1* | 10/2014 | Takahashi | F02B 37/183 |
| | | | 415/145 |
| 2014/0345273 A1* | 11/2014 | Yamaguchi | F02B 37/183 |
| | | | 60/602 |

FOREIGN PATENT DOCUMENTS

| | | |
|---|---|---|
| DE | 102015008358 A1 | 1/2016 |
| DE | 102015011585 A1 | 4/2016 |
| DE | 102015012727 A1 | 5/2016 |
| GB | 231930 A | 4/1925 |
| GB | 2312930 A | 11/1997 |

* cited by examiner

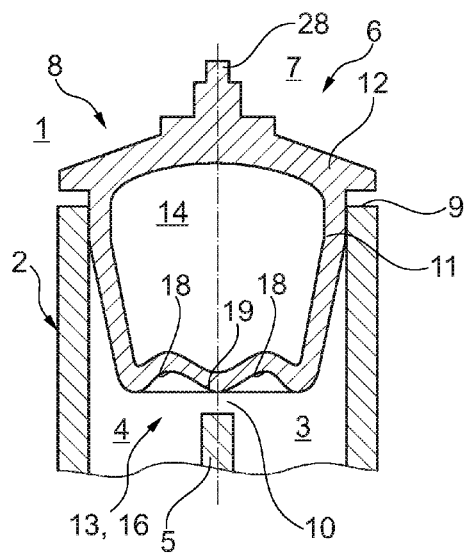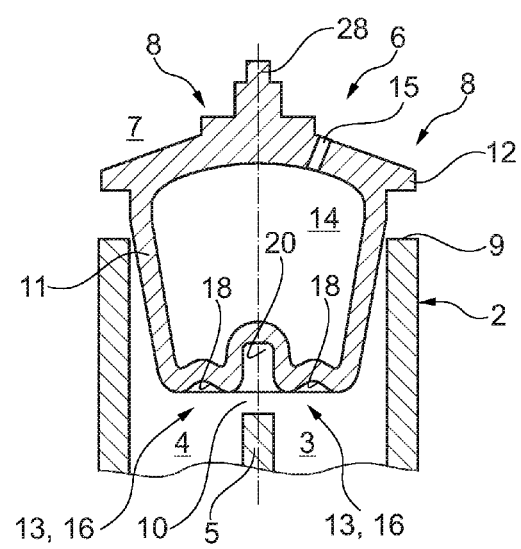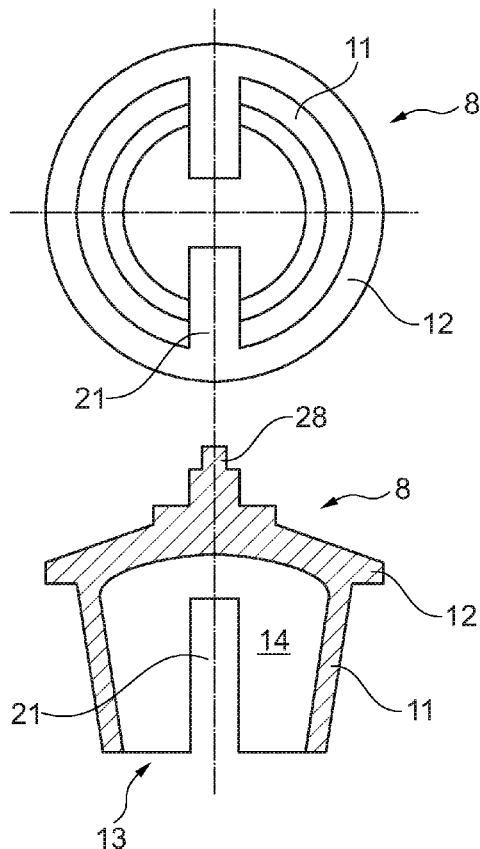

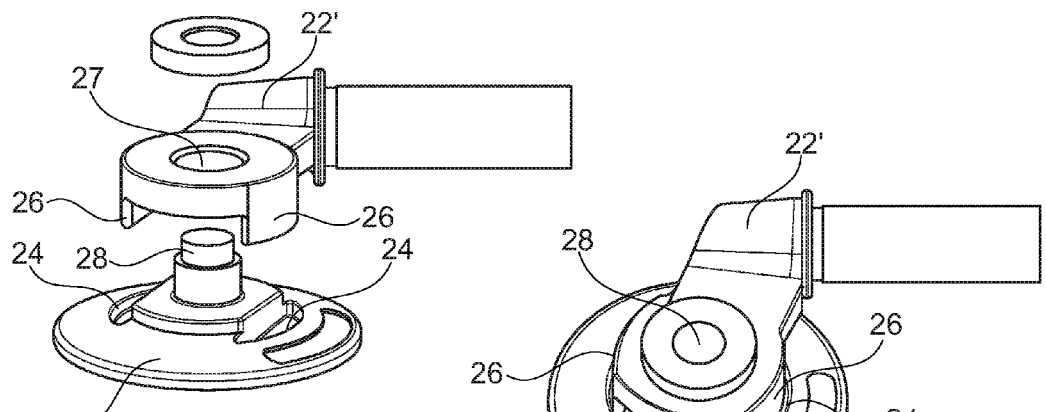
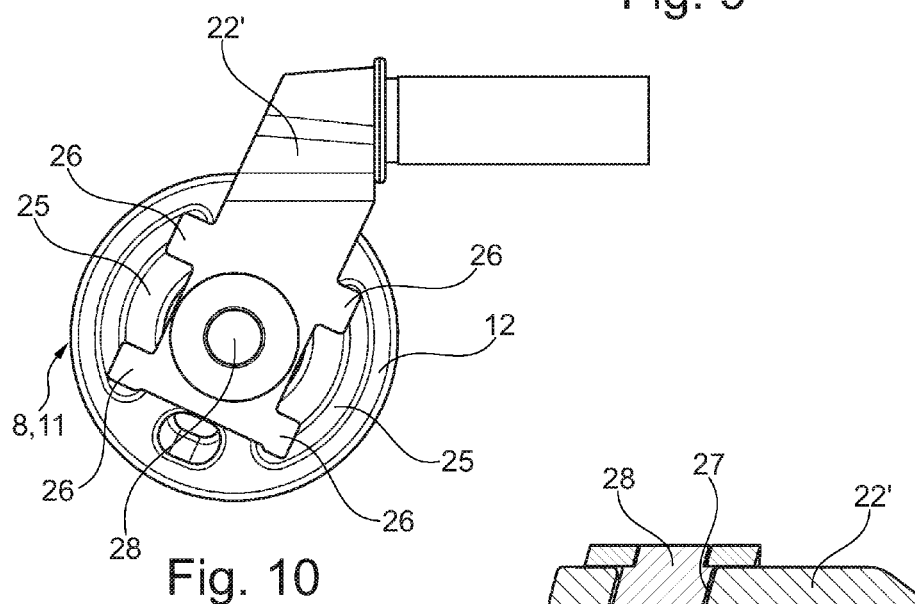
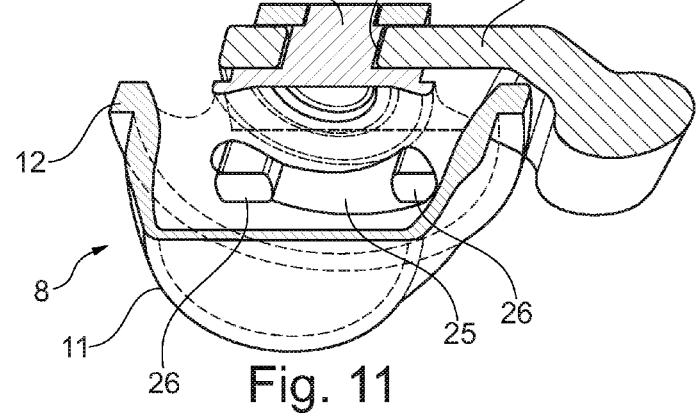

EXHAUST GAS TURBOCHARGER

CROSS-REFERENCE TO RELATED APPLICATIONS

This application claims priority to German Patent Application No. 20 2015 104 843.2, filed May 18, 2015, to German Patent Application No. 10 2015 218 696.2, filed Sep. 29, 2015, and to German Patent Application No. 10 2016 204 076.6, filed Mar. 11, 2016 the contents of which are hereby incorporated by reference in their entirety.

TECHNICAL FIELD

The present invention relates to an exhaust gas turbocharger with a turbine housing and a turbine arranged therein.

BACKGROUND

GB 231,930 A discloses an exhaust gas turbocharger of the type in question with a turbine housing and a turbine arranged therein, wherein the turbine housing has two exhaust gas channels which are separated from each other via a partition. Furthermore, a wastegate valve is provided via which the two exhaust gas channels are connectable to a bypass duct bypassing the turbine.

DE 198 53 391 A1 discloses a wastegate valve for controlling the charge air pressure, in which some of the exhaust gas can be conducted via a bypass past a turbine into an exhaust gas system. In order to avoid instabilities of the wastegate valve during opening and closing, the valve body is designed in such a manner that a progressively increasing cross section is obtained during the opening operation. For this purpose, the valve body is, for example, of hemispherical design.

US 2005/086936 A1 in turn discloses an exhaust gas turbocharger with a turbine housing and a turbine arranged therein, wherein the turbine housing has two exhaust gas channels which are separated from each other via a partition. A wastegate valve is likewise provided via which the two exhaust gas channels can be connected to a bypass duct bypassing the turbine.

Generally, a differentiation is made in exhaust gas turbochargers between what is referred to as ram supercharging and pulse supercharging, wherein, in the case of the ram supercharging, the pressure pulsations, which are caused by discharging, of the individual cylinders are smoothed in a single exhaust gas collecting container. By this means, within the range of high motor rotational speeds, a turbine can put through more exhaust gas at a low pressure. Since it is possible for the internal combustion engine to discharge counter to a lower exhaust-gas counter pressure, the fuel consumption is reduced in this operating range. However, the comparatively low motor torque at lower rotational speeds has a disadvantageous effect.

In order, at low motor rotational speeds to be able in turn to obtain a large motor torque, use is made of what is referred to as pulse supercharging. In this case, the exhaust gases of the individual cylinders are conducted in individual pipelines to the turbine of the exhaust gas turbocharger. Owing to small pipe diameters, use is made of the kinetic energy of the exhaust gas pulsation. The pressure in the lines is not constant here. The individual exhaust gas lines are also guided separately here within the turbine housing as far as the turbine wheel, which can be achieved, for example, by means of a multi channel housing.

The invention is therefore concerned with the problem of specifying, for an exhaust gas turbocharger of the type in question, an improved or at least an alternative embodiment which overcomes disadvantages known from the prior art and in particular is of lighter construction.

This problem is achieved according to the invention by the subject matter of the independent Claim(s). Advantageous embodiments are the subject matter of the dependent claims.

SUMMARY

The present invention is based on the general concept of designing a wastegate valve in a turbine housing of an exhaust gas turbocharger in such a manner that both pulse supercharging and ram supercharging are possible via said wastegate valve, and the advantages of both methods can thereby be used and the disadvantages thereof avoided. For this purpose, the exhaust gas turbocharger according to the invention has, in a known manner, a turbine housing with a turbine arranged therein, wherein the turbine housing has two, in particular spiral, exhaust gas channels which are separated from each other via a partition. The two exhaust gas channels can be connected via the wastegate valve to a bypass duct bypassing the turbine. The wastegate valve itself has, according to the invention, a hollow, and therefore light, valve body and a valve seat interacting therewith, and is designed in such a manner that ram supercharging or pulse supercharging is possible depending on the degree of opening of the wastegate valve, that is to say depending on the degree of opening of the valve body. A connecting opening is provided between the two exhaust-gas channels, where a base region of the valve body is designed in such a manner that either a discharging of the exhaust-gas stream into the bypass duct or an overflowing through the connecting opening into the other exhaust-gas channel is promoted. By this means, it is firstly possible to put through more exhaust gas at high rotational speeds and lower exhaust gas counter pressure and to thereby realize a lower fuel consumption within said operating range. Secondly, at low motor rotational speeds, use can be made of the kinetic energy of the exhaust gas pulsations in order, even at low motor rotational speeds, to be able to obtain a large motor torque via the pulse supercharging. This is realized by the fact that, at low motor rotational speeds, the wastegate valve is opened merely with a small opening angle and an only small cross section opens between the two exhaust gas channels while the cross section opened to the bypass duct is larger. At high rotational speeds, the ram supercharging is realized by the fact that the wastegate valve is opened with a larger opening angle and the connecting cross section between the two exhaust gas channels is larger than a blow off cross section toward the bypass duct.

The valve seat is expediently arranged at the transition to the bypass duct, and the previously described connecting opening is provided between the two exhaust gas channels. The valve body here has a conical basic body and a valve collar, wherein, when the wastegate valve is closed, the valve collar rests tightly on the valve seat while the basic body at least for the most part closes the connecting opening. By this means, it is possible, when the wastegate valve is completely closed, to separate the two exhaust gas channels of the exhaust gas turbocharger according to the invention preferably almost completely and thereby to realize pulse supercharging. Of course, certain leakage flows, caused by manufacturing tolerances, between the exhaust gas channels may nevertheless occur without impairing the effect of the pulse supercharging.

In an advantageous development of the solution according to the invention, a base of the valve body or of the basic body is of convex design and thereby promotes a discharging of the exhaust-gas stream in the bypass duct. This makes it possible to achieve improved flowing out via the wastegate valve seat and also a reduced flow resistance when the valve body or the basic body of the valve body enters the exhaust-gas channels.

In an alternative embodiment of the solution according to the invention, a base of the valve body is of concave design and thereby promotes an overflowing through the connecting opening into the other exhaust-gas channel. Improved ram supercharging can thereby be achieved. In the case of ram supercharging, the channel connection is used to produce an equalization of the pressure which reduces the pressure and smooths pressure pulsations. By this means, a turbine can put through more exhaust gas within the range of high motor rotational speeds. Since it is possible for the motor to discharge counter to a lower exhaust-gas counterpressure, the fuel consumption is reduced in this operating range.

In a further advantageous embodiment of the exhaust-gas turbocharger according to the invention, a base of the valve body is of corrugated design with a respective corrugation in the region of each exhaust-gas channel and with a partition support. By means of the at least one corrugation in the region of each exhaust-gas channel and the partition support, an improved flow over the partition in the region of the connecting opening can likewise be made possible in order to realize ram supercharging.

Expediently, a base of the valve body is of corrugated design, with at least one corrugation in the region of each exhaust-gas channel and with a partition recess in the region of the partition. The at least one corrugation in the region of each exhaust-gas channel in turn improves a flow over the partition in the region of the connecting opening, wherein, when the wastegate valve is closed, the partition at least slightly enters the partition recess of the valve body, as a result of which, in particular in the case of small opening angles of the valve body or when the wastegate valve is closed, an improved separation of the channels and an increased discharging in the bypass duct can be achieved. By this means, a significantly improved response behaviour of an internal combustion engine equipped with an exhaust-gas turbocharger of this type can likewise be achieved.

In a further advantageous embodiment of the exhaust gas turbocharger according to the invention, the valve body is designed as a single piece, cast hollow profile. This permits an economical and high quality design of the valve body, wherein use can be made as the core of a ceramic core which is etched out in a later method step. Alternatively, of course, sand or salt cores are also conceivable. Furthermore, the design in the form of a hollow profile makes it possible to achieve a comparatively low weight of the entire valve body, as a result of which the latter requires lower adjustment forces for the adjustment and at the same time has lower bearing forces and therefore lower wear.

Alternatively thereto, it is also conceivable for the valve body to be formed as a hollow profile which is constructed from a plurality of parts, in particular as a hollow profile which is constructed from the valve collar and the basic body, wherein the basic body and the valve collar are welded to each other. By this means, a cost effective, weight reduced design of the valve body can likewise be realized.

The wastegate valve expediently has a cranked spindle arm which permits rotation of the valve body level with the valve seat. Furthermore, the entry body, that is to say the basic body in this case, is kept at least slightly conical, as a result of which particularly reliable and collision free entry is possible.

In a further advantageous embodiment of the solution according to the invention, the valve body is of round design in the region of the valve collar and has an elliptical shape at its free end facing away from the valve collar. At an opening angle $\alpha$ of the valve body of approximately 7° to at least 25° to 32°, a blow off behaviour at a consistently low level is thereby achieved.

Further important features and advantages of the invention emerge from the dependent claims, from the drawings and from the associated description of the figures with reference to the drawings.

It goes without saying that the features mentioned above and those which have yet to be explained below can be used not only in the respectively stated combination, but also in different combinations or on their own without departing from the scope of the present invention.

Preferred exemplary embodiments of the invention are illustrated in the drawings and are explained in more detail in the description below, wherein the same reference signs relate to identical or similar or functionally identical components.

BRIEF DESCRIPTION OF THE DRAWINGS

In the drawings, in each case schematically,

FIG. 4 shows a sectional illustration through a valve body with a corrugated base and with a partition support, FIG. 5 shows a sectional illustration through a valve body with a corrugated base region and with a partition recess, FIG. 6 shows a sectional illustration and a view from below of a downwardly open valve body according to the invention with a slot in the region of a partition, FIG. 8 shows an exploded illustration of a spindle arm and valve collar, which can be arranged thereon, with means for securing against rotation, FIG. 9 shows an illustration as in FIG. 8, but in the mounted state, FIG. 10 shows a top view of a further embodiment of a means for securing a valve body against rotation on the spindle arm, FIG. 11 shows a sectional illustration through FIG. 10.

DETAILED DESCRIPTION

Figure 1:
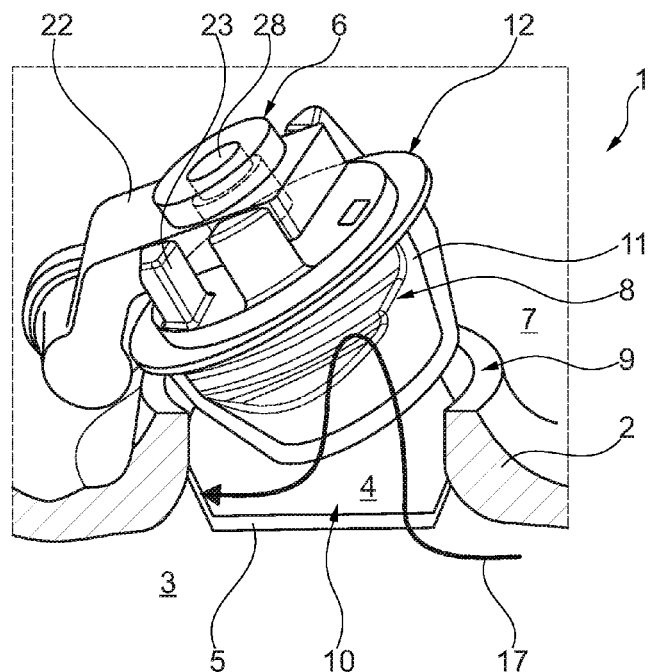
FIG. 1 shows a partially sectioned view through an exhaust-gas turbocharger according to the invention in the region of a wastegate valve.
Figure 7:
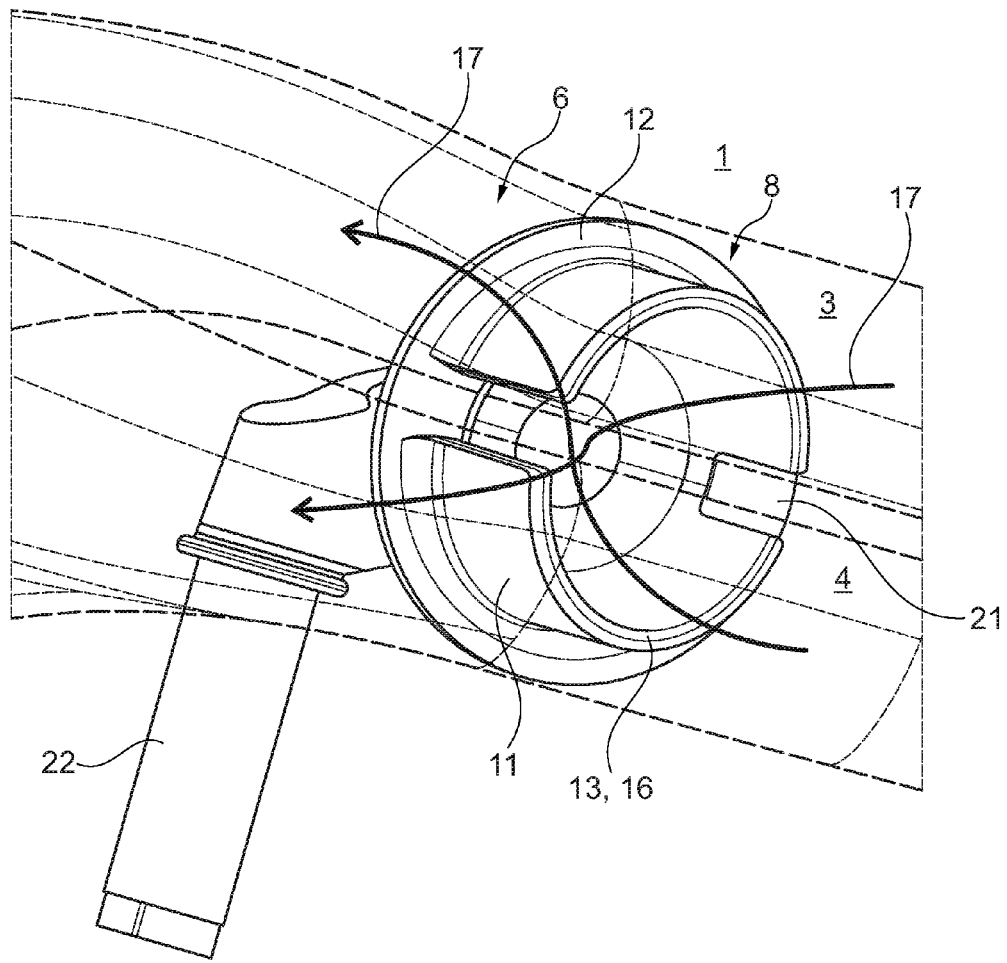
FIG. 7 shows possible flows via a connecting opening between the two adjacent exhaust-gas channels in the case of the wastegate valve body shown according to FIG. 6.

According to FIG. 1, an exhaust gas turbocharger 1 according to the invention has a turbine housing 2 with a turbine which is arranged therein, wherein the turbine housing 2 has two exhaust gas channels 3, 4 which are separated from each other via a partition 5. A wastegate valve 6 is furthermore provided via which the two exhaust gas channels 3, 4 are connectable to a bypass duct 7 bypassing the turbine. According to the invention, the wastegate valve 6 now has a hollow valve body 8 (see also FIGS. 2 7) and a valve seat 9 interacting therewith and is also designed in such a manner that ram supercharging or pulse supercharging is possible depending on the degree of opening of the wastegate valve 6. A connecting opening 10 is provided between the two exhaust-gas channels 3, 4. The valve seat 9 is arranged here at the transition between the two exhaust gas channels 3, 4 to the bypass duct 7. The connecting opening 10 can be varied with respect to its passage cross section by adjustment of the valve body 8.

If the valve body 8 according to FIGS. 1 to 7 is viewed more closely, it can be seen that said valve body has a conical basic body 11 and a valve collar 12, wherein, when the wastegate valve 6 is closed, the valve collar 12 rests tightly on the valve seat while the basic body 11 closes, or at least almost closes, the connecting opening 10. The basic body 11 is designed here preferably in a tapering manner from cylindrical to elliptically conical in order to keep the blow-off behaviour approximately constant at opening angles of approx. 7° to 23°. The conical design of the basic body 11 makes it easier to insert same through the valve seat 9 without a collision. Furthermore, the basic body 11 can have lateral cutouts which enable the production of the pulse supercharging depending on the opening angle of the wastegate valve 6. The lateral cutouts on the basic body 11 improve the blow-off behaviour at a small opening angle of in particular α<7°.

Figure 2:
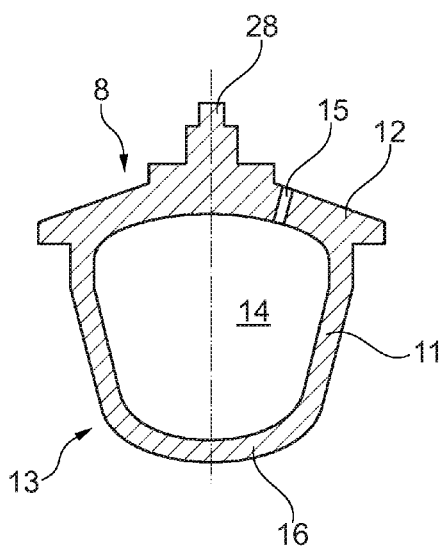
FIG. 2 shows a sectional illustration through a valve body according to the invention with a convex base region.

According to FIGS. 2 6, different embodiments of the valve body 8 according to the invention are illustrated here, wherein said valve body is designed in all of the embodiments as a hollow valve body 8, that is to say as a hollow profile, in particular as a cast hollow profile. The valve body 8 or the basic body 11 has a cylindrical cross section in the region of the valve collar 12 and tapers elliptically towards a base region 13. By means of the hollow or open embodiment of the valve body 8 according to the invention, the latter can be designed to be significantly lighter, as a result of which lower actuating forces are also required in order to actuate the valve body 8. The lower weight of the valve body 8 means that in particular also lower forces act on the remaining wastegate valve components, such as, for example, the valve seat 9, during the operation of the exhaust-gas turbocharger 1. By this means, a not inconsiderable reduction in wear can be achieved and a failure of the individual components can be avoided.

The hollow valve body 8 (see FIGS. 2 5) or the downwardly open valve body 8 (see FIG. 6) can be produced by a metallic casting process, wherein a cavity 14 within the basic body 11 or the valve body 8 can be realized by means of an expendable core. An expendable core of this type can be designed as a ceramic core, for example, which is etched out later, or else by means of a sand or salt core. For the casting process itself, at least one opening 15 is provided on the valve collar 12 in a manner penetrating the latter, and by means of which valve collar the core is positioned and held for the casting process. Alternatively, a plurality of such openings 15 may of course also be provided in order to stabilize the positioning. The opening 15 furthermore serves here for removing the core forming the cavity 14 after the casting process is finished and, during operation, can ensure that the pressure between cavity 14 and bypass duct 7 is equalized.

Purely theoretically, the valve body 8 could of course also be designed as a hollow profile constructed from the valve collar 12 and the basic body 11, wherein in this case the basic body 11 and the valve collar 12 are welded to each other.

Figure 3:
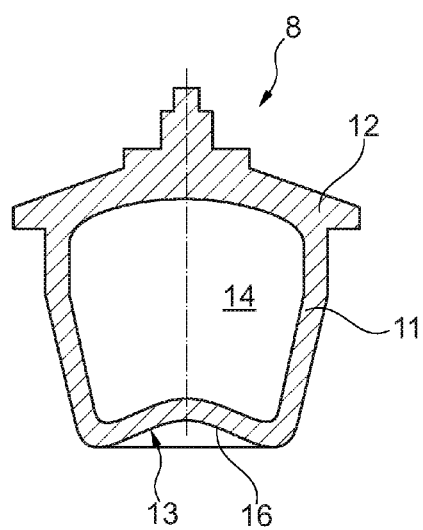
FIG. 3 shows an illustration as in FIG. 2, but with a concave base region.

If the valve body 8 according to FIG. 2 is then viewed, it can be seen that the base region 13 or a base 16 is of convex design and thereby promotes a discharging of an exhaust-gas stream 17 into the bypass duct 7. By contrast, the base 16 or the base region 13 of the valve body 8 illustrated according to FIG. 3 is of concave design and thereby promotes an overflowing through the connecting opening 10 into the adjacent exhaust-gas channel 3, 4 (also see FIGS. 1 and 7).

If the valve body 8 illustrated according to FIG. 4 is viewed, it is possible to see therein a base region 13 or a base 16 which is of corrugated design, with a respective corrugation 18 in the region of each exhaust-gas channel 3, 4 and with a partition support 19.

If the valve body 8 illustrated according to FIG. 5 is viewed, it can be seen at said valve body that a base region 13 or the base 16 is likewise of corrugated design, with a respective corrugation 18 in the region of each exhaust-gas channel 3, 4 and with a partition recess 20 in the region of the partition 5. This affords the great advantage that the valve body 8, if it approaches its final closed state, already travels with the partition recess 20 over the partition 5 and thereby at least partially closes the connecting opening 10 between the two exhaust-gas channels 3, 4. Even at small opening angles, an overlapping region remains here between the partition 5 and the partition recess 20, said overlapping region reducing the cross section of the connecting opening 10, as a result of which more exhaust gas is blown off into the bypass duct 7 instead of being exchanged between the two exhaust-gas channels 3, 4 via the connecting opening 10.

If the valve body 8 according to FIG. 6 is viewed, it is possible to see therein a downwardly open basic body 11 which, in the base region 13, has a slot 21 in the region of the partition 5 (not illustrated). In this case, it is, for example, conceivable for the valve body 8 in the closed state to move with its slot 21 over the partition 5, with an overflow behaviour comparable to the designs 3, 4 being possible.

In all of the embodiments shown, the valve body 8 is of cylindrical or rotationally symmetrical design in the region of the valve collar 12, whereas it has an elliptical cross section towards its base region 13, which facilitates entry into the valve seat opening. By this means, even at comparatively small opening angles of between approx. 10° and 30°, a blow-off behaviour at a consistently low level can be achieved.

It can furthermore be seen from FIGS. 1 and 7 and 8 to 11 that the wastegate valve 6 has a cranked spindle arm 22, 22' which permits a rotation of the valve body 8 level with the valve seat 9, that is to say that, a pivot point or an axis of rotation of the spindle arm 22, 22' lies level with the valve seat 9. A collision-free entry and exit of the basic body 11 into/from the turbine housing 2 or the valve seat 9 can thereby also be made possible.

In order to avoid the valve body 8 or in general a flap plate rotating because of the flow of the exhaust gas, a means of securing against rotation is provided. Without such a means, the frictional wear may be of such a high level that component failure occurs. In any case, such means of securing against rotation are imperative in the case of valve bodies 8 which do not have a symmetrical contour, in order to avoid jamming. In the case of turbine housings 2 with two exhaust gas channels 3, 4, means of securing against rotation having more than one arm 26 and an associated depression 24 or opening 25 have proven more robust and resistant to wear.

If FIGS. 8 to 11 are viewed, such a means of securing against rotation can be seen there, for the realization of which the wastegate valve 6 has a spindle arm 22' on which at least one arm 26 is integrally formed, said arm engaging in an associated depression 24 (cf. FIGS. 8 and 9) of a valve collar 12 or of a valve body 8 or an opening 25 in the valve body 8 on the valve collar 12 thereof. The depressions 24 or the openings 25 are already produced during the casting process. The means of securing against rotation that are shown according to FIGS. 8 and 9 have the advantage that there is more material around the through opening 27 because of the arms 26, which are formed in the shape of circular segments.

The means of securing against rotation that are shown in FIGS. 8 to 11 have the advantage here of being compact in construction and being able to be arranged in a space saving manner. Furthermore, the machining of a pin 28 is simpler since there are no interfering rotational stops 23 (cf. FIG. 1). In addition, an at least slight saving on material can also be achieved with the means of securing against rotation that are shown. The means of securing against rotation that are shown in FIGS. 8 to 11 furthermore afford the advantage that better core securing during the casting of the valve body 8 is possible since attached rotational stops 23 (cf. FIG. 1) can seal the holding pins protruding from the ceramic core or are not useable in the region in the vicinity of the core.

With the wastegate valve 6 according to the invention and the exhaust gas turbocharger 1 according to the invention, the advantages of ram supercharging (lower exhaust gas counter pressure and lower fuel consumption of the motor at a high motor rotational speed) can be realized with those of pulse charging (high motor torque at low motor rotational speeds) in a single exhaust gas turbocharger 1. Furthermore, by means of the valve body 8 which, according to the invention, is of hollow and therefore comparatively light design, the required actuating forces can be reduced and, in addition, weight can be saved, which has a positive long-term effect on the fuel consumption of a motor vehicle. The significantly lighter valve body 8 also results in a reduction in the loadings for the other components of the wastegate valve 6, for example for the valve seat 9, and therefore these components can also be of lighter design and/or have a longer service life. Furthermore, with the reduction in weight, expensive material is saved.

The invention claimed is:

1. An exhaust gas turbocharger, comprising:
a turbine housing and a turbine arranged in the turbine housing;
at least two exhaust gas channels disposed in the turbine housing and separated from each other via a partition;
a connecting opening arranged between the at least two exhaust gas channels;
a wastegate valve, wherein the at least two exhaust gas channels are connectable to a bypass duct bypassing the turbine via the wastegate valve;
the wastegate valve including a hollow valve body and a valve seat interacting with the valve body, the valve body including a valve collar structured and arranged to engage against the valve seat, wherein the wastegate valve is configured such that at least one of ram supercharging and pulse supercharging is performed depending on a degree of opening of the wastegate valve;
wherein the valve body has a base region configured to facilitate at least one of a discharging of an exhaust-gas stream into the bypass duct and an overflowing of one exhaust gas channel through the connecting opening into the other exhaust-gas channel; and
wherein the valve body has a round cross section in a region of the valve collar and tapers elliptically towards the base region to facilitate closing the connecting opening.

2. The exhaust-gas turbocharger according to claim 1, wherein the base region of the valve body includes a base having a convex shape configured to facilitate the discharging of the exhaust-gas stream into the bypass duct.

3. The exhaust-gas turbocharger according to claim 1, wherein the base region of the valve body includes a base having a concave shape configured to facilitate the overflowing through the connecting opening.

4. The exhaust-gas turbocharger according to claim 1, wherein the base region of the valve body includes a base having a corrugated configuration including at least one corrugation disposed in a region of each of the at least two exhaust-gas channels, and wherein the base further includes a partition support disposed in a region of the partition.

5. The exhaust-gas turbocharger according to claim 1, wherein the base region of the valve body includes a base having a corrugated configuration including at least one corrugation disposed in a region of each of the at least two exhaust-gas channels, and wherein the base further includes a partition recess disposed in a region of the partition.

6. The exhaust-gas turbocharger according to claim 1, wherein the valve body is open in the base region and has a slot for receiving the partition when the wastegate valve is closed.

7. The exhaust-gas turbocharger according to claim 1, wherein the valve body has a conical basic body defining a cross section shape that tapers from cylindrical in the region of the valve collar to elliptically conical towards the base region.

8. The exhaust-gas turbocharger according to claim 1, wherein the valve body encloses a cavity connected to the environment via at least one opening.

9. The exhaust-gas turbocharger according to claim 7, wherein:
the valve body is configured as a single-piece cast hollow profile, or
the valve body is configured as a multi-part hollow profile having the valve collar and the basic body, wherein the basic body and the valve collar are welded to each other.

10. The exhaust-gas turbocharger according to claim 1, wherein the wastegate valve includes a spindle arm and at least one arm integrally formed on the spindle arm, and wherein the at least one arm engages in an associated depression in the valve body to secure against rotation.

11. The exhaust-gas turbocharger according to claim 10, wherein the associated depression is an opening in the valve body.

12. The exhaust-gas turbocharger according to claim 10, wherein the associated depression is disposed in the valve collar of the valve body.

13. The exhaust-gas turbocharger according to claim 1, wherein the valve body further includes at least one rotational stop projecting transversely from the valve collar to secure the valve body against rotation.

14. An exhaust-gas turbocharger, comprising:
a turbine housing;
a turbine arranged in the turbine housing, wherein the turbine housing includes at least two exhaust gas channels and a partition separating the at least two exhaust gas channels from each other;

a connecting opening arranged between the at least two exhaust gas channels;

a wastegate valve arranged such that the at least two exhaust gas channels are connectable to a bypass duct bypassing the turbine, the wastegate valve including a hollow valve body and a valve seat interacting with the valve body, wherein the wastegate valve is configured such that at least one of a ram supercharging operation and a pulse supercharging operation is performed in response to a degree of opening of the wastegate valve;

wherein the valve body has a valve collar engaging against the valve seat and a base disposed opposite the valve collar, and wherein the base is configured to facilitate at least one of a discharging of an exhaust-gas stream into the bypass duct and an overflowing of one exhaust gas channel through the connecting opening into the other exhaust-gas channel; and wherein the base has a corrugated configuration including at least one corrugation disposed in a region of each of the at least two exhaust gas channels.

15. The exhaust-gas turbocharger according to claim 14, wherein the at least one corrugation for each of the at least two exhaust gas channels is provided by a locally concave shape defined on the base.

16. The exhaust-gas turbocharger according to claim 14, wherein the corrugated configuration further includes a partition support disposed between the at least one corrugation for each of the at least two exhaust gas channels in a region of the partition, and wherein the partition support protrudes outwardly from the base in a direction away from the valve collar.

17. The exhaust-gas turbocharger according to claim 14, wherein the corrugated configuration further includes a partition recess disposed between the at least one corrugation for each of the at least two exhaust channels in a region of the partition.

18. The exhaust-gas turbocharger according to claim 14, wherein the valve body encloses a cavity, and wherein the cavity is connected to an external environment via at least one opening disposed in a region of the valve collar.

19. An exhaust gas turbocharger, comprising:
a turbine housing and a turbine arranged in the turbine housing;
at least two exhaust gas channels disposed in the turbine housing and separated from each other via a partition;
a connecting opening arranged between the at least two exhaust gas channels;
a wastegate valve arranged such that the at least two exhaust gas channels are connectable to a bypass duct bypassing the turbine, the wastegate valve configured to perform at least one of a ram supercharging operation and a pulse supercharging operation in response to a degree of opening of the wastegate valve;
the wastegate valve including a hollow valve body and a valve seat interacting with the valve body, the valve body having a base region configured to facilitate at least one of a discharging of an exhaust-gas stream into the bypass duct and an overflowing of one exhaust gas channel through the connecting opening into the other exhaust gas channel of the at least two exhaust gas channels; and
wherein the wastegate valve further includes a spindle arm and at least one arm extending from the spindle arm, and wherein the at least one arm engages in at least one of an associated depression and an associated opening in the valve body to secure against rotation.

20. The exhaust gas turbocharger according to claim 19, wherein the spindle arm is coupled to a valve collar of the valve body at a connection where a pin is received in a through opening, and wherein the at least one arm protrudes transversely from the spindle arm and engages into the at least one of the associated depression and the associated opening.

* * * * *